(12) United States Patent
Yoshida

(10) Patent No.: US 10,249,224 B2
(45) Date of Patent: Apr. 2, 2019

(54) IMAGE SUPPLY DEVICE, METHOD OF CONTROLLING IMAGE SUPPLY DEVICE, AND PROGRAM

(71) Applicant: SEIKO EPSON CORPORATION, Tokyo (JP)

(72) Inventor: Mitsuhiro Yoshida, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/489,892

(22) Filed: Apr. 18, 2017

(65) Prior Publication Data

US 2017/0316726 A1 Nov. 2, 2017

(30) Foreign Application Priority Data

Apr. 27, 2016 (JP) .................. 2016-089736

(51) Int. Cl.
| | | |
|---|---|---|
| H04N 5/232 | (2006.01) | |
| G09G 3/00 | (2006.01) | |
| G09G 3/20 | (2006.01) | |
| G09G 3/3208 | (2016.01) | |
| G09G 3/36 | (2006.01) | |
| H04N 9/31 | (2006.01) | |

(52) U.S. Cl.
CPC ........... *G09G 3/002* (2013.01); *G09G 3/2092* (2013.01); *G09G 3/3208* (2013.01); *G09G 3/36* (2013.01); *H04N 5/23245* (2013.01); *H04N 9/3179* (2013.01); *G09G 2320/0666* (2013.01); *G09G 2340/045* (2013.01); *G09G 2340/0435* (2013.01); *G09G 2354/00* (2013.01); *G09G 2370/12* (2013.01)

(58) Field of Classification Search
CPC ........ G09G 3/002; G09G 3/3208; G09G 3/36; G09G 3/2092; G09G 2340/045; G09G 2354/00; G09G 2370/12; G09G 2320/0666; G09G 2340/0435; H04N 9/3179; H04N 5/23245
See application file for complete search history.

(56) References Cited

U.S. PATENT DOCUMENTS

| | | |
|---|---|---|
| 2011/0221763 A1 | 9/2011 | Arizumi et al. |
| 2013/0113684 A1 | 5/2013 | Sugimura |

FOREIGN PATENT DOCUMENTS

| | | |
|---|---|---|
| JP | 2009-229924 A | 10/2009 |
| JP | 2011-191499 A | 9/2011 |
| JP | 2013-97328 A | 5/2013 |
| JP | 2015-230587 A | 12/2015 |

*Primary Examiner* — Padma Haliyur
(74) *Attorney, Agent, or Firm* — Oliff PLC

(57) ABSTRACT

A terminal device includes an image acquisition section adapted to obtain an image data, and an image transfer section adapted to transmit the image data obtained by the image acquisition section. The image transfer section outputs information related to a processing capacity of the image transfer section to the image acquisition section, and the image acquisition section determines a frequency of outputting the image data to the image transfer section based on the information related to the processing capacity of the image transfer section.

9 Claims, 6 Drawing Sheets

IMAGE SUPPLY DEVICE, METHOD OF CONTROLLING IMAGE SUPPLY DEVICE, AND PROGRAM

CROSS-REFERENCE

The entire disclosure of Japanese Patent Application No. 2016-89736, filed Apr. 27, 2016, is expressly incorporated by reference herein.

BACKGROUND

1. Technical Field

The present invention relates to an image supply device, a method of controlling an image supply device, and a program.

2. Related Art

In the past, there has been known a system in which an image supply device (terminal) transmits image data to a display device such as a projector device, and the display device displays an image based on the image data received (see, e.g., JP-A-2015-230587).

In general, in such a device for transmitting image data to an external device as the image supply device described above, a functional section for obtaining the image data and a functional section for transmitting the image data perform a process in association with each other to perform the transmission of the image data. However, there is a problem that the processing load increases due to the fact that these functional sections operate independently of each other, and there is caused an influence on the process related to the transmission of the image data in some cases.

SUMMARY

An advantage of some aspects of the invention is to perform an efficient process with respect to a process of transmitting image data regarding an image supply device for transmitting the image data to thereby reduce the processing load.

An image supply device according to an aspect of the invention includes an image acquisition section adapted to obtain an image data, and an image transfer section adapted to transmit the image data obtained by the image acquisition section, the image transfer section outputs information related to a processing capacity of the image transfer section to the image acquisition section, and the image acquisition section determines a frequency of outputting the image data to the image transfer section based on the information related to the processing capacity of the image transfer section.

According to the configuration of this aspect of the invention, it is possible for the image acquisition section to output the image data to the image transfer section at an appropriate acquisition frame rate reflecting the processing capacity of the image transfer section, and it is possible to prevent the image acquisition section from unnecessarily performing the output of the image data to the image transfer section, and thus, the processing efficiency can be improved, and at the same time the processing load can be reduced.

In the aspect of the invention, the information related to the processing capacity of the image transfer section may be information based on time actually required by the image transfer section for performing a process related to transmission of the image data.

According to this configuration of the aspect of the invention, it is possible for the image acquisition section to determine the frequency of outputting the image data to the image transfer section while reflecting the time actually required by the image transfer section for performing the process related to the transmission of the image data to thereby set the frequency to an appropriate value.

In the aspect of the invention, the image transfer section may output the information related to the processing capacity of the image transfer section to the image acquisition section with predetermined intervals, and the image acquisition section may determine the frequency of outputting the image data to the image transfer section based on the information related to the processing capacity of the image transfer section, and perform output of the image data with the frequency determined.

According to this configuration of the aspect of the invention, even in the case in which the condition for the image transfer section to transmit the image data varies in accordance with the communication state between the image supply device and the external device as a target of the data transmission, the usage condition of the processor by other programs running in the image supply device, and so on, the value of the frequency can dynamically be set in accordance with the change in the condition of the process in the image transfer section due to the determination of the frequency performed periodically with predetermined intervals.

In the aspect of the invention, the image supply device may further include a processor, and the processor may execute a first program to thereby realize a function of the image acquisition section, and execute a second program different from the first program to thereby realize a function of the image transfer section.

According to this configuration of the aspect of the invention, due to the fact that the image acquisition section for realizing the function based on the first program and the image transfer section for realizing the function based on the second program different from the first program use the common processor, under the condition that the process of either one of the functional sections increases the processing load of the processor to affect the process of the other of the functional sections, by improving the processing efficiency, the increase in processing load of the processor can effectively be suppressed.

In the aspect of the invention, the image supply device may further include an imaging section adapted to perform shooting, and the image transfer section may transmit the image data based on a shooting result of the imaging section in real time in response to the shooting.

According to this configuration of the aspect of the invention, it is possible for the image supply device to transmit the image data to the external device based on the shooting result by the imaging section in real time in response to the shooting to thereby make the external device perform a predetermined process such as display of the image based on the image data.

In a case of transmitting the image data based on the shooting result of the imaging section in real time in response to the shooting, the image transfer section performs a process of outputting the information related to the processing capacity of the image transfer section to the image acquisition section, and the image acquisition section performs a process of determining a frequency of outputting the image data to the image transfer section based on the information related to the processing capacity of the image transfer section.

According to this configuration of the aspect of the invention, in the light of the fact that the process related to the shooting of the imaging section is heavy in processing load, suppression of the increase of the processing load can effectively be realized.

In the aspect of the invention, the image supply device may further include a mode switching section adapted to switch an operation mode, and the mode switching section may switch the operation mode to either of a first mode for transmitting image data other than the image data based on the shooting result of the imaging section and a second mode for transmitting the image data based on the shooting result of the imaging section in real time in response to the shooting.

According to this configuration of the aspect of the invention, in the light of the fact that the process related to the shooting of the imaging section is heavy in processing load, by switching the operation mode with appropriate timing, suppression of the increase of the processing load can effectively be realized.

Another aspect of the invention is directed to a method of controlling an image supply device including providing the image supply device with an image acquisition section adapted to obtain an image data and an image transfer section adapted to transmit the image data obtained by the image acquisition section, outputting, by the image transfer section, information related to a processing capacity of the image transfer section to the image acquisition section, and determining, by the image acquisition section, a frequency of outputting the image data to the image transfer section based on the information related to the processing capacity of the image transfer section.

According to the configuration of this aspect of the invention, it is possible for the image acquisition section to output the image data to the image transfer section at an appropriate acquisition frame rate reflecting the processing capacity of the image transfer section, and it is possible to prevent the image acquisition section from unnecessarily performing the output of the image data to the image transfer section, and thus, the processing efficiency can be improved, and at the same time the processing load can be reduced.

Another aspect of the invention is directed to a not-transitory computer-readable medium storing a program to be executed by a control section adapted to control the image supply device, the program causes the control section to: function as an image acquisition section adapted to obtain an image data and an image transfer section adapted to transmit the image data obtained by the image acquisition section, as the image transfer section, output information related to a processing capacity of the image transfer section to the image acquisition section, and as the image acquisition section, determine a frequency of outputting the image data to the image transfer section based on the information related to the processing capacity of the image transfer section.

According to the configuration of this aspect of the invention, by the image supply device executing the program, it is possible for the image acquisition section to output the image data to the image transfer section at an appropriate acquisition frame rate reflecting the processing capacity of the image transfer section, and it is possible to prevent the image acquisition section from unnecessarily performing the output of the image data to the image transfer section, and thus, the processing efficiency can be improved, and at the same time the processing load can be reduced.

BRIEF DESCRIPTION OF THE DRAWINGS

The invention will now be described with reference to the accompanying drawings, wherein like numbers reference like elements.

DESCRIPTION OF AN EXEMPLARY EMBODIMENT

An embodiment of the invention will hereinafter be described with reference to the accompanying drawings.

Figure 1:
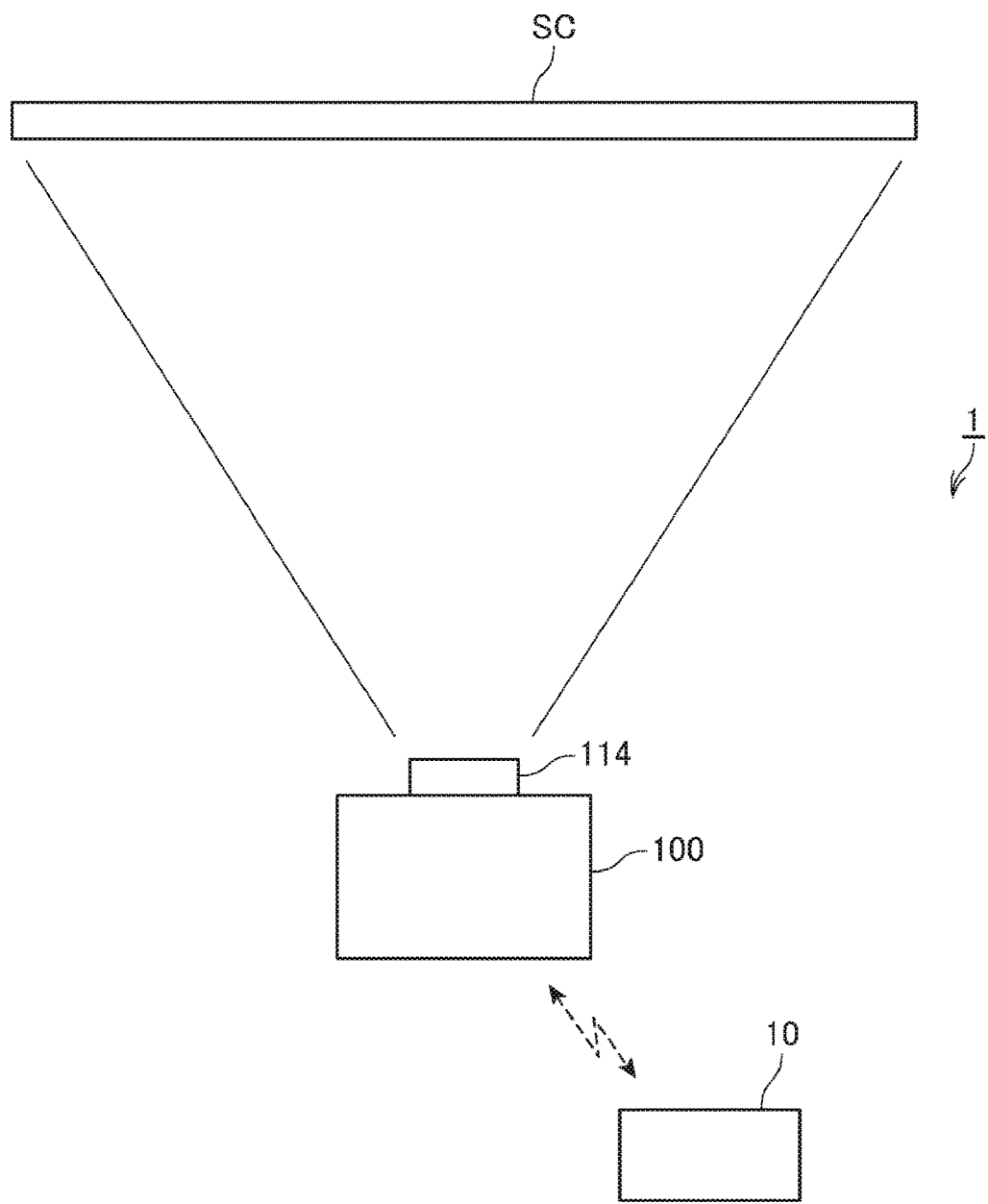
FIG. 1 is a diagram showing a schematic configuration of an image projection system.

FIG. 1 is a diagram showing a schematic configuration of an image projection system 1 according to the embodiment. The image projection system 1 is provided with a projector 100 and a terminal device 10 (an image supply device).

In the present embodiment, the projector 100 and the terminal device 10 are connected to each other so as to be able to transmit and receive a variety of types of data with a wireless communication method. As the wireless communication method, there can be adopted, for example, a near field communication method such as a wireless local area network (LAN), Bluetooth (registered trademark), UWB (ultra wide band), or infrared communication, or a wireless communication method using a mobile telephone line.

The projector 100 projects image light on a projection target to display an image based on image data on a surface of the projection target. The projection target on which the projector 100 projects the image can be a flat surface or an uneven surface, and in the present embodiment, the case of projecting the image on a screen SC formed of a flat surface will be illustrated. A fixed flat surface such as a wall surface can be used as the screen SC, or the screen SC can be a suspended type or a rising type curtain-like screen. The projector 100 is provided with a projection opening part 114 for projecting the image light. The projection opening part 114 is an opening part through which a projection optical system 113 (FIG. 2) incorporated in the projector 100 emits light.

The terminal device 10 is a device such as a cellular phone such as a smartphone, a tablet terminal, or a PDA (personal digital assistants). The terminal device 10 is provided with a display section 60 (FIG. 3) for displaying a variety of images. The terminal device 10 transmits the image data, which represents the image to be displayed by the display section 60, to the projector 100.

Figure 2:
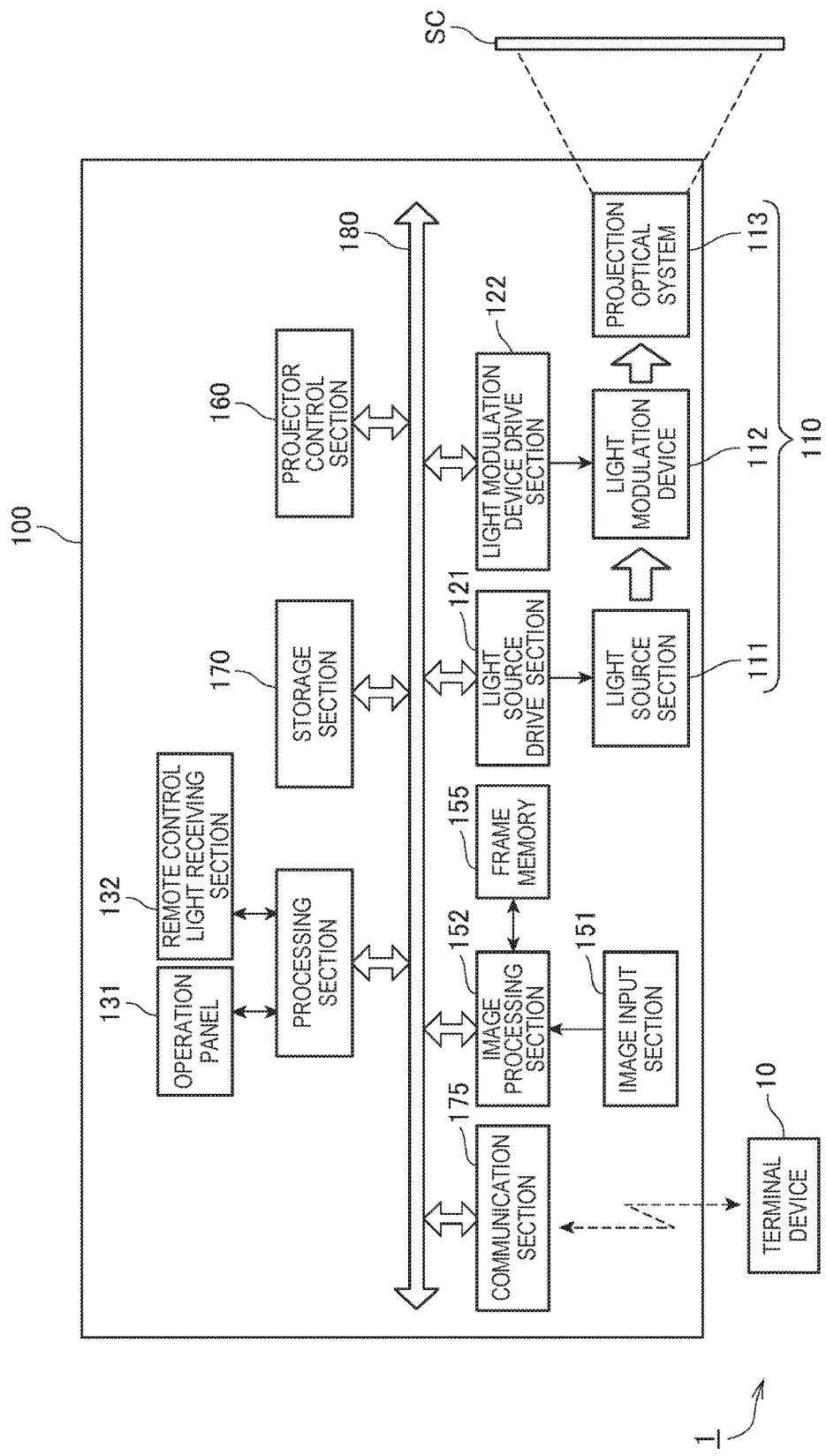
FIG. 2 is a diagram showing a configuration of a projector.

FIG. 2 is a diagram showing a configuration of the projector 100.

The projector 100 is provided with an image input section 151. The image input section 151 is provided with a connector for connecting a cable and an interface circuit (both not shown), and the image data supplied from a device connected via the cable is input to the image input section 151. It should be noted that in the present embodiment, there is illustrated a configuration in which the image data transmitted from the terminal device 10 is not input to the image input section 151.

The interface provided to the image input section 151 can also be an interface for data communication such as Ethernet (registered trademark), IEEE 1394, or USB. Further, the interface of the image input section 151 can also be an interface for image data such as MHL (registered trademark), HDMI (registered trademark), or DisplayPort.

Further, it is also possible for the image input section 151 to have a configuration provided with a VGA terminal to which an analog video signal is input, or a DVI (digital visual interface) terminal to which a digital video data is input. Further, the image input section 151 is provided with an A/D conversion circuit, and in the case in which the analog vide signal is input via the VGA terminal, the image input section 151 converts the analog video signal into the image data with the A/D conversion circuit to output the image data to an image processing section 152.

The projector 100 is provided with a projection section 110 for performing formation of an optical image to project the image on the screen SC. The projection section 110 is provided with a light source section 111 as a light source, alight modulation device 112, and a projection optical system 113.

The light source section 111 is provided with a light source such as a xenon lamp, a super-high pressure mercury lamp, a light emitting diode (LED), or a laser source. Further, the light source section 111 can also be provided with a reflector and an auxiliary reflector for guiding the light emitted by the light source to the light modulation device 112. Further, the light source section 111 can also be provided with a lens group for improving the optical characteristics of the projection light, a polarization plate, a dimming element for reducing the light intensity of the light emitted by the light source on a path leading to the light modulation device 112, and so on (all not shown).

The light source section 111 is driven by a light source drive section 121. The light source drive section 121 is connected to an internal bus 180. The light source drive section 121 supplies the light source section 111 with drive power to put on and off the light source of the light source section 111 in accordance with the control by a projector control section 160. It should be noted that it is also possible to adopt a configuration in which the luminance of the light source of the light source section 111 can be controlled with the drive power supplied by the light source drive section 121.

The light modulation device 112 is provided with, for example, three liquid crystal panels corresponding respectively to the three primary colors of RGB. The light emitted by the light source section 111 is separated into colored light beams of three colors of RGB, and the colored light beams respectively enter the corresponding liquid crystal panels. The three liquid crystal panels are each a transmissive liquid crystal panel, and modulate the light beams transmitted through the liquid crystal panels to generate the image light beams. The image light beams, which have been modulated while passing through the respective liquid crystal panels, are combined by a combining optical system such as a cross dichroic prism, and are then output to the projection optical system 113.

To the light modulation device 112, there is connected a light modulation device drive section 122 for driving the liquid crystal panels of the light modulation device 112. The light modulation device drive section 122 is connected to the internal bus 180. The light modulation device drive section 122 generates each of the image signals of R, G, and B based on the image data input from the image processing section 152. Based on the image signals of R, G, and B thus generated, the light modulation device drive section 122 drives the liquid crystal panels corresponding to the image signals of the light modulation device 112 to draw the images on the respective liquid crystal panels.

The projection optical system 113 is provided with a lens group for projecting the image light, which has been modulated by the light modulation device 112, toward the screen SC to form the image on the screen SC. Further, the projection optical system 113 is also provided with a zoom mechanism for performing expansion/contraction of the projection image on the screen SC, and a focus adjustment mechanism for performing an adjustment of the focus.

The projector 100 is provided with an operation panel 131 and a processing section 133. The processing section 133 is connected to the internal bus 180. The operation panel 131 is provided with a variety of switches and indicator lamps for the user to perform operations. The operation panel 131 is connected to the processing section 133. The processing section 133 lights or blinks the indicator lamps of the operation panel 131 at appropriate timings in accordance with the operation state and the setting state of the projector 100 due to the control by the projector control section 160. When the switch of the operation panel 131 is operated, an operation signal corresponding to the switch thus operated is output from the processing section 133 to the projector control section 160.

Further, the projector 100 is provided with a remote control light receiving section 132 for receiving an infrared signal transmitted from a remote controller (not shown) used by the user. The remote control light receiving section 132 is connected to the processing section 133. The remote control light receiving section 132 receives the infrared signal transmitted from the remote controller. The processing section 133 decodes the infrared signal received by the remote control light receiving section 132 to generate data representing the operation content in the remote controller, and then outputs the data to the projector control section 160.

The projector 100 is provided with a communication section 175. The communication section 175 is provided with an antenna, an RF (radio frequency) circuit, and so on not shown, and performs the wireless communication with the terminal device 10 in accordance with a wireless communication standard in accordance with the control by the projector control section 160. The projector 100 and the terminal device 10 are connected to each other so as to be able to transmit and receive a variety of types of data with a wireless communication method. In the present embodiment, the communication section 175 receives the image data transmitted from the terminal device 10.

The projector 100 is provided with an image processing system. The image processing system is constituted by the projector control section 160 for performing overall control of the whole of the projector 100 as a central constituent, and is provided with the image processing section 152, a frame memory 155, and a storage section 170 besides the projector control section 160. The projector control section 160, the image processing section 152, and the storage section 170 are connected to the internal bus 180.

The image processing section 152 develops the image data received by the communication section 175, or the image data input from the image input section 151 in the frame memory 155 in accordance with the control by the projector control section 160. The image processing section 152 performs processes such as a resolution conversion (scaling) process, a resizing process, correction of a distortion aberration, a shape correction process, a digital zoom process, and an adjustment of the tint and luminance of the image to the image data developed in the frame memory.

The image processing section 152 performs the process designated by the projector control section 160, and performs the process using a parameter input from the projector control section 160 as needed. Further, it is obviously possible for the image processing section 152 to perform two or more of the processes described above in combination with each other. The image processing section 152 reads out the image data, on which the process has been performed, from the frame memory 155, and then outputs the image data to the light modulation device drive section 122.

The projector control section 160 is provided with hardware such as a processor, a read only memory (ROM), and a random access memory (RAM) (all not shown). The ROM is a nonvolatile storage device formed of a semiconductor storage element such as a flash ROM, and stores a control program executed by the processor and a variety of types of data. The RAM constitutes a working area of the processor. The processor develops the control program, which has been read out from the ROM or the storage section 170, in the RAM, and then executes the control program developed in the RAM to control each section of the projector 100.

The storage section 170 is a nonvolatile storage device, and is realized by a storage device such as a flash memory, an erasable programmable ROM (EPROM), an electrically EPROM (EEPROM), or a hard disc drive (HDD). The storage section 170 stores, for example, the image data to be projected by the projection section 110 on the screen SC.

Figure 3:
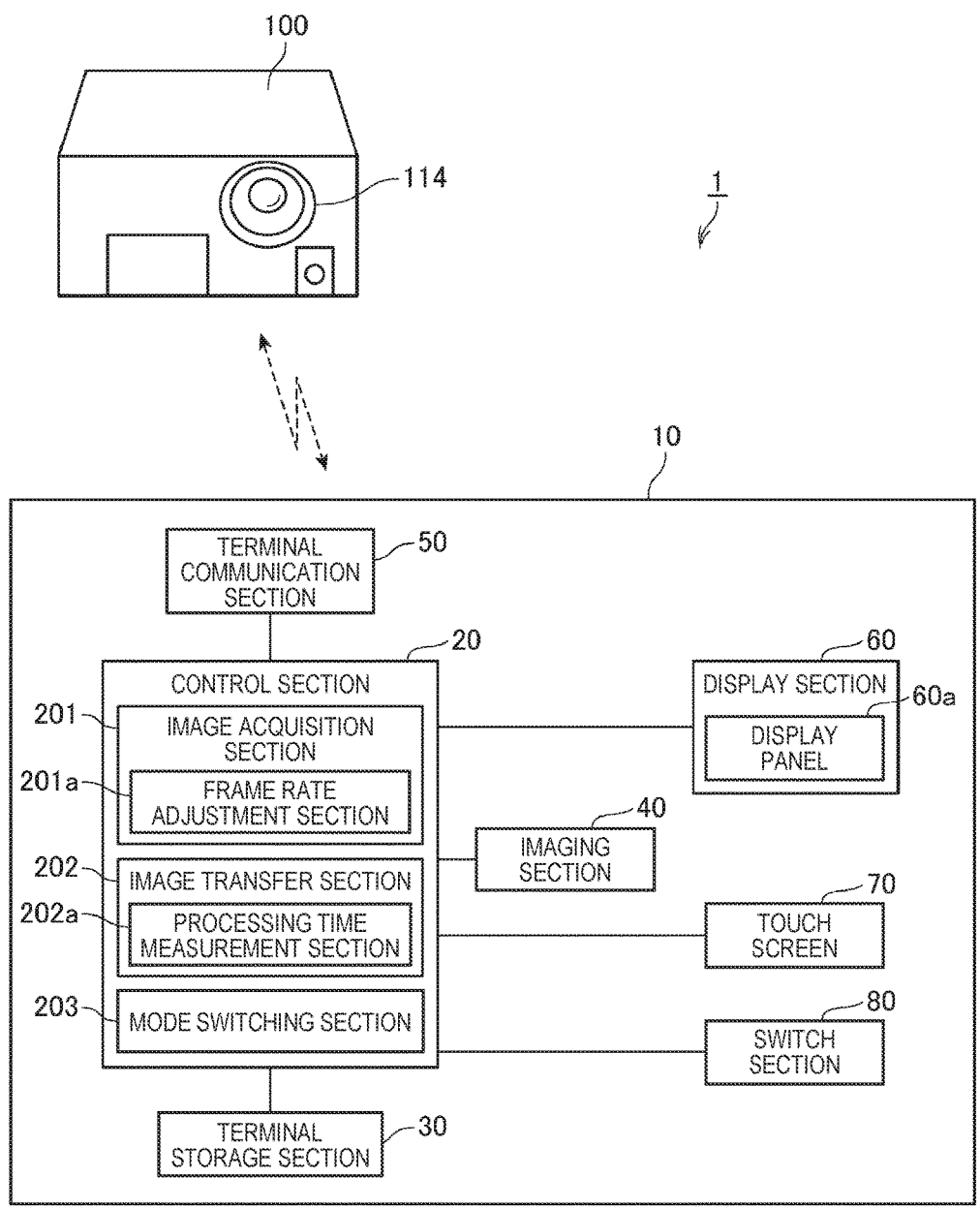
FIG. 3 is a diagram showing a configuration of a terminal device.

FIG. 3 is a block diagram showing a configuration of the terminal device 10.

As shown in FIG. 3, the terminal device 10 is provided with a control section 20. To the control section 20, there are connected a terminal storage section 30, an imaging section 40, a terminal communication section 50, a display section 60, a touch screen 70, and a switch section 80. The control section 20 controls each of these sections to thereby control the terminal device 10.

The control section 20 is provided with hardware such as a processor, a ROM, and a RAM (all not shown). The ROM is a nonvolatile storage device formed of a semiconductor storage element such as a flash ROM, and stores a control program executed by the processor and a variety of types of data. The RAM constitutes a working area of the processor. The processor develops the control program, which has been read out from the ROM, in the RAM, and then executes the control program developed in the RAM to control each section of the terminal device 10.

As shown in FIG. 3, the control section 20 is provided with an image acquisition section 201, an image transfer section 202, and a mode switching section 203 as functional blocks (functional sections). Further, the image acquisition section 201 is provided with a frame rate adjustment section 201a. Further, the image transfer section 202 is provided with a processing time measurement section 202a. The functions of the functional blocks provided to the control section 20, and processes performed based on the functions will be described later.

The terminal storage section 30 is provided with a nonvolatile memory such as an EEPROM, and stores a variety of types of data.

The imaging section 40 is provided with an imaging element such as a CCD sensor or a CMOS image sensor, a shooting lens group, a lens drive section for driving the lens group in order to perform adjustment of zoom or focus, and so on, and performs shooting in accordance with the control by the control section 20. The imaging section 40 generates the image data as needed based on the shooting result, and then outputs the image data to the control section 20.

The terminal communication section 50 is provided with an antenna, an RF circuit, and so on, and transmits and receives a variety of types of data in accordance with the wireless communication method described above with the projector 100 due to the control by the control section 20.

The display section 60 is provided with a display panel 60a such as a liquid crystal panel or an organic EL panel, and displays a variety of images on the display panel 60a due to the control by the control section 20.

The touch screen 70 is disposed so as to overlap the display panel 60a, detects a touch operation to the display panel 60a, and then outputs a position signal representing an operation position thus detected to the control section 20. The control section 20 detects the position where the touch operation has been performed based on the input from the touch screen 70, and then performs a process corresponding to the touch operation.

The switch section 80 is provided with operators such as switches provided to the housing of the terminal device 10 in addition to the touch screen 70, and outputs an operation signal to the control section 20 in the case in which any of these switches are operated. The control section 20 performs a process corresponding to the operation based on the operation signal input from the switch section 80.

Under the configuration described hereinabove, the projector 100 is capable of communicating with the terminal device 10 to display a moving image on the screen SC.

Hereinafter, basic operations of the projector 100 and the terminal device 10 in the case of displaying the moving image on the screen SC will be described. I should be noted that the projector 100 continuously displays still images of the respective frames on the screen SC to thereby perform display of the moving image.

When displaying the moving image, the terminal device 10 continuously transmits the image data of the respective still images constituting the moving image to the projector 100 frame by frame. In other words, in the present embodiment, the "image data" includes data related to the still images of the respective frames transmitted from the terminal device 10 to the projector 100 when displaying the moving image by the projector 100.

As described above, the image processing section 152 of the projector 100 develops the image data, which is received from the terminal device 10, in the frame memory 155, then performs predetermined image processing on the image data, and then outputs the result to the light modulation device drive section 122. The light modulation device drive section 122 controls the light modulation device 112 to display the still image based on the image data on the screen SC based on the image data thus input. The projector 100 repeatedly performs the display of the still image based on the image data described above continuously frame by frame to thereby display the moving image.

Then, an operation of the terminal device 10 when transmitting the image data related to the moving image in the display of the moving image by the projector 100 will be described in detail.

Here, regarding the transmission of the image data related to the moving image, the terminal device 10 has a first mode and a second mode as an operation mode. Hereinafter, the operation of the terminal device 10 in the first mode will be described in detail, a problem of the first mode will be described, and then the operation of the terminal device 10 in the second mode will be described in detail.

It should be noted that as described later, the mode switching section 203 of the terminal device 10 according to the present embodiment switches the operation mode between the first mode and the second mode in a predetermined case. However, instead of the configuration in which the operation mode is automatically switched, it is also possible to adopt a configuration in which either one of the operation modes continues in accordance with the setting of the user and so on. Further, it is also possible to adopt a configuration in which the terminal device 10 is not provided with an operation mode corresponding to the first mode as the operation mode, and always performs the operation corresponding to the second mode.

First Mode

Figure 4:
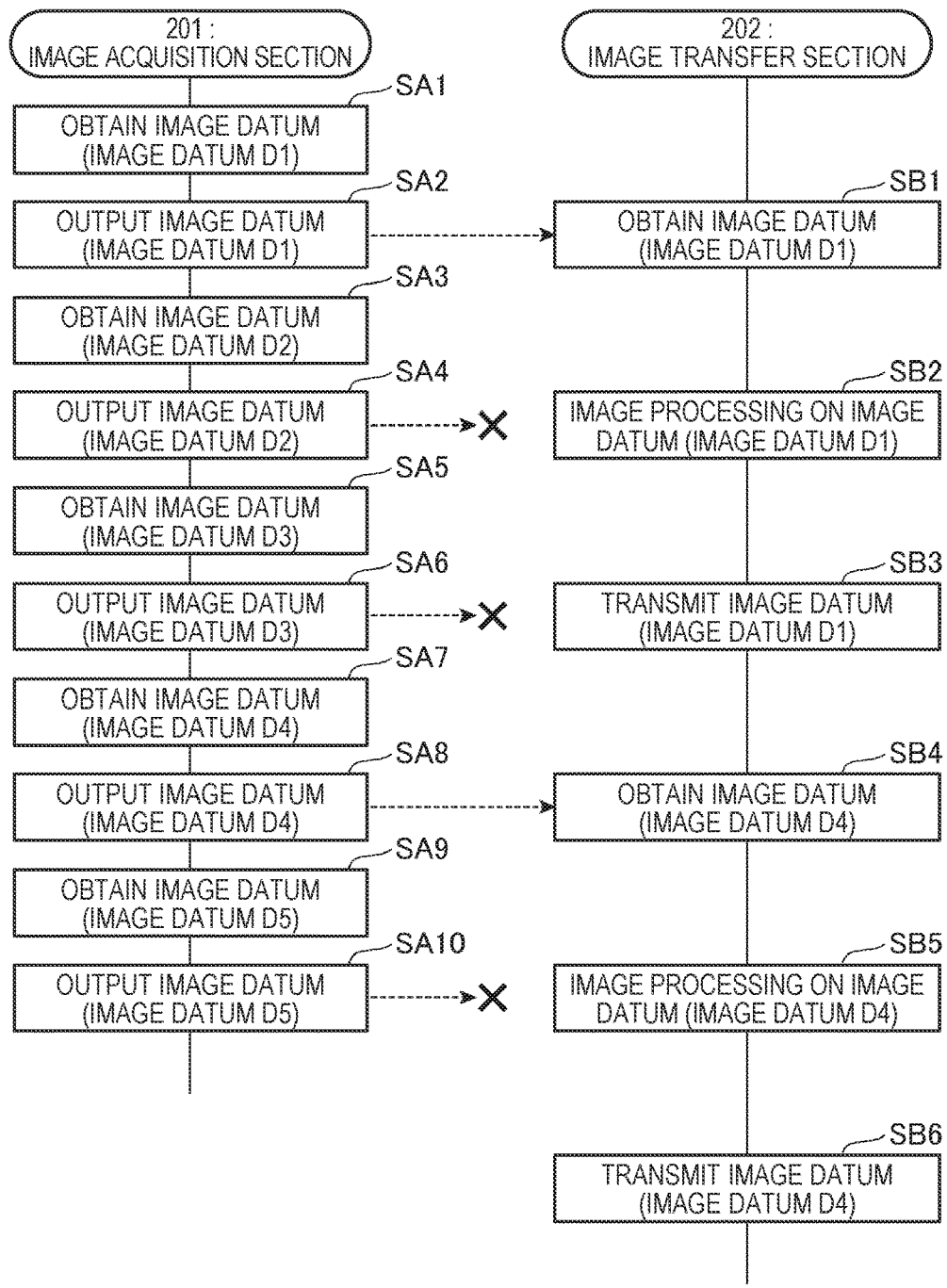
FIG. 4 is a sequence chart showing operations of an image acquisition section and an image transfer section in a first mode.

FIG. 4 is a sequence chart showing operations of the image acquisition section 201 and the image transfer section 202 when the terminal device 10 transmits the image data related to the moving image in the first mode.

In FIG. 4, there is described the operation of the terminal device 10 in the case in which a moving image file having a predetermined format is stored in the terminal storage section 30 in advance, and the image data based on the moving image file are transmitted.

It should be noted that the first mode will hereinafter be described using the case in which the terminal device 10 transmits the image data to the projector 100 based on the moving image file stored in advance as an example. It should be noted that in the first mode, the image data transmitted by the terminal device 10 to the projector 100 are not limited to the image data related to the moving image file stored in advance in the terminal device 10. For example, it is also possible for the terminal device 10 to transmit the image data corresponding to the image displayed on the display panel 60a of the terminal device 10. On this occasion, there occurs the state in which the projector 100 displays the image on the screen SC in sync with the image displayed on the display panel 60a of the terminal device 10.

Here, the image acquisition section 201 is a functional block for performing the process due to the function of a first program downloaded in the terminal device 10. The first program is, for example, a part of a program provided to the operating system (OS) of the terminal device 10, and is, for example, a dedicated application to which the function of the image acquisition section 201 described below is implemented.

Further, the image transfer section 202 is a functional block for performing the process due to the function of a second program different from the first program described above. The second program is, for example, a dedicated application provided by a manufacturer of the projector 100, and is downloaded in the terminal device 10 due to a download service of a predetermined application.

The second program related to the image transfer section 202 is capable of performing inter-program communication with the first program related to the image acquisition section 201 using a predetermined application programming interface (API) provided by the OS. Transmission and reception of the data between the image acquisition section 201 described below and the image transfer section 202 are performed by the inter-program communication using the API.

Further, the process of the image acquisition section 201 and the process of the image transfer section 202 are performed with assignments of a common processor provided to the control section 20 performed.

As shown in FIG. 4, the image acquisition section 201 performs image processing such as extraction of the data as needed to sequentially perform acquisition of the image data and output of the image data thus obtained to the image transfer section 202 frame by frame at a predetermined frame rate based on the moving image file stored in the terminal storage section 30.

Specifically, in the step SA1, the image acquisition section 201 obtains an image data D1, and then, in the step SA2, the image data D1 thus obtained is output to the image transfer section 202. Specifically, in the step SA3, the image acquisition section 201 obtains an image data D2, and then, in the step SA4, the image data D2 thus obtained is output to the image transfer section 202. In the step SA5, the image acquisition section 201 obtains an image data D3, and then, in the step SA6, the image data D3 thus obtained is output to the image transfer section 202. In the step SA7, the image acquisition section 201 obtains an image data D4, and then, in the step SA8, the image data D4 thus obtained is output to the image transfer section 202. In the step SA9, the image acquisition section 201 obtains an image data D5, and then, in the step SA10, the image data D5 thus obtained is output to the image transfer section 202.

As described above, the image acquisition section 201 repeatedly performs acquisition of the image data and output of the image data based on the moving image file at the predetermined frame rate until output of all of the image data related to the moving image based on the moving image file is completed.

As shown in FIG. 4, the image transfer section 202 obtains (step SB1) the image data D1 output by the image acquisition section 201 in the step SA2.

Then, the image transfer section 202 performs (step SB2) necessary image processing on the image data D1 obtained in the step SB1. The image processing in the step SB2 is a process of converting the image data input from the image acquisition section 201 into the image data appropriate as the data transmitted to the projector 100. For example, the image processing includes a color conversion process, a resolution conversion process, a size conversion process, an image compression process, and so on. The color conversion process is a process for converting each of dots constituting the image data into a dot (a dot expressing degrees of R, G, and B with grayscale values) in a color coordinate system used for the display by the projector 100. The resolution conversion process is a process for converting the resolution of the image data into the resolution the projector 100 is compliant with. The size conversion process is a process for converting the size (the number of dots in each of the vertical and horizontal directions) of the image data into the size the projector 100 is compliant with. The image compression process is a process for compressing the image data with a predetermined compression format.

Subsequently, the image transfer section 202 controls the terminal communication section 50 to transmit (step SB3) the image data D1 to the projector 100.

Here, during the period from when the image transfer section 202 obtains one image data in accordance with output of the one image data of the image acquisition section 201 to when the transmission of the one image data to the projector 100 by the image transfer section 202 is completed, the image transfer section 202 does not perform acquisition of a new image data but discards the new image data even in the case in which output of the new image data by the image acquisition section 201 has occurred. The image transfer section 202 makes the transition to the state in which acquisition of a new image data can be achieved after the transmission of the one image data to the projector 100 has been completed, and then obtains the image data output by the image acquisition section 201 at the first time after the transition to that state has been made.

In FIG. 4, the output of the image data by the image acquisition section 201 in the step SA4 and the step SA6 is a process performed before the transmission of the image data D1 having been obtained by the image transfer section 202 in the step SB1 to the projector 100 is completed. Therefore, the image data D2 output by the image acquisition section 201 in the step SA4 and the image data D3 output by the image acquisition section 201 in the step SA6 are discarded without being transmitted to the projector 100.

As shown in FIG. 4, in the step SB4, the image transfer section 202 obtains the image data D4 output by the image acquisition section 201 in the step SA8. Subsequently, the image transfer section 202 performs (step SB5) the image processing on the image data D4. Subsequently, the image transfer section 202 transmits (step SB6) the image data D4 to the projector 100.

Since the output of the image data D5 by the image acquisition section 201 in the step SA10 is a process performed before the transmission of the image data D4 to the projector 100, the image data D5 is discarded without being transmitted to the projector 100 as described above.

Hereinabove, the operation of the terminal device 10 when transmitting the image data in the first mode is described. In the case in which the terminal device 10 transmits the image data in the first mode, there is the following problem.

In the following description, the frame rate at which the image acquisition section 201 outputs the image data to the image transfer section 202 is referred to as an "acquisition frame rate," and the frame rate at which the image transfer section 202 transmits the image data to the projector 100 is referred to as a "transmission frame rate."

The acquisition frame rate is the number of times the image acquisition section 201 obtains the image data in "1 second" as a unit time. Further, the transmission frame rate is the number of times the image transfer section 202 performs the necessary image processing on the image data and then transmits the image data to the projector 100 in "1 second" as the unit time.

The acquisition frame rate corresponds to a "frequency of the image acquisition section 201 outputting the image data to the image transfer section 202."

Regarding the first mode described hereinabove, the following problem exists.

That is, in the first mode, the transmission frame rate is lower than the acquisition frame rate. Further, due to the fact that the transmission frame rate is lower than the acquisition frame rate, there arises a problem that an unnecessary process is performed by the image acquisition section 201.

In the detailed description, as described above, during the period from when the image transfer section 202 obtains one image data in accordance with output of the one image data of the image acquisition section 201 to when the transmission of the one image data to the projector 100 by the image transfer section 202 is completed, the image transfer section 202 does not perform acquisition of a new image data but discards the new image data even in the case in which the output of the new image data by the image acquisition section 201 has occurred. Therefore, the process related to the acquisition and the output of the image data performed by the image acquisition section 201 during the period from when the image transfer section 202 has obtained one image data to when the image transfer section 202 performs the transmission of the one image data becomes the unnecessary process for obtaining the image data having no chance to be transmitted to the projector 100. In the example shown in FIG. 4, the process of the step SA3 through the step SA6, and the process of the step SA9 and the step SA10 are the unnecessary processes.

Further, the processor provided to the control section 20 is also assigned to the unnecessary processes by the image acquisition section 201, which leads to an increase in processing load. Here, in the case in which the processing load increases beyond the allowable range, the assignment of the processor to the process by the image transfer section 202 is affected to cause drop of the transmission frame rate, and the image data are thinned when transmitted to the projector 100 due to the existing function of the image transfer section 202 in some cases. If the transmission frame rate is dropped, or the image data are thinned when transmitted to the projector 100, there is a possibility that the degradation of the quality of the moving image displayed by the projector 100 is incurred.

In light of the above, in the second mode, it is suppressed that the unnecessary process is performed by the image acquisition section 201, and thus, an improvement in efficiency of the process by the image acquisition section 201 and the image transfer section 202 is realized.

Second Mode

Figure 5:
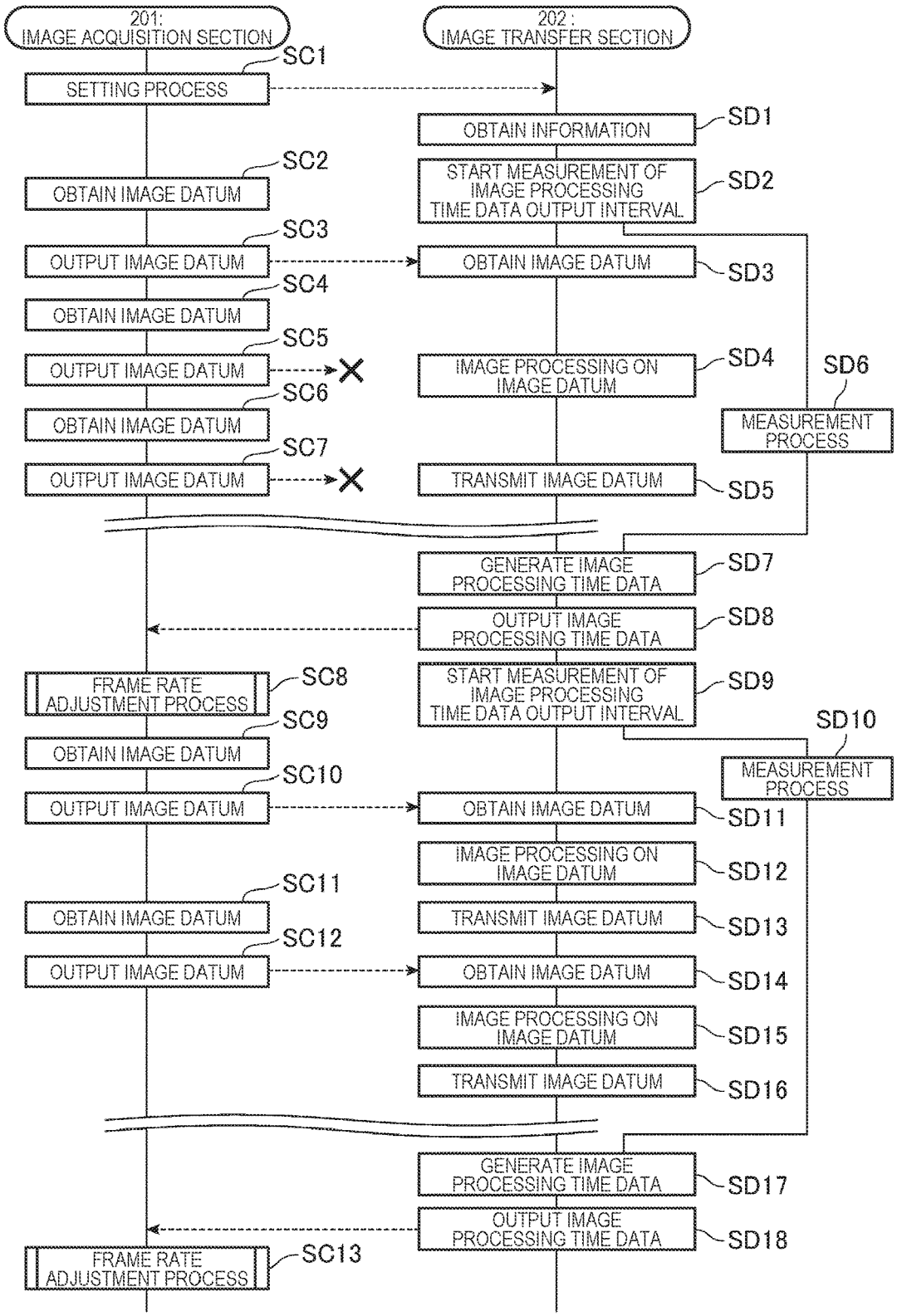
FIG. 5 is a sequence chart showing operations of the image acquisition section and the image transfer section in a second mode.

Then, the second mode will be described. FIG. 5 is a sequence chart showing operations of the image acquisition section 201 and the image transfer section 202 when the terminal device 10 transmits the image data related to the moving image in the second mode.

Here, in the present embodiment, the mode switching section 203 of the control section 20 performs the switching of the operation mode between the first mode and the second mode in the following case.

In the case of transmitting the image data to the projector 100 in real time based on the shooting result of the imaging section 40 so as to display the moving image based on the shooting result of the imaging section 40 by the projector 100 in real time, the mode switching section 203 switches the operation mode to the second mode. The reason therefor is as follows. That is, in the case of displaying the moving image based on the shooting result of the imaging section 40 by the projector 100 in real time, a process related to the shooting by the imaging section 40 is performed in parallel to the processes by the image acquisition section 201 and the image transfer section 202. Further, since the process related to the shooting by the imaging section 40 is heavy in processing load of the processor, in order to prevent the drop of the transmission frame rate and thinning of the image data in the transmission to the projector 100, reduction of the processing load is more strongly requested.

It should be noted that regarding the switching to the second mode, it is possible to adopt a configuration in which, for example, the mode switching section 203 performs the switching in accordance with an instruction of the user, or a configuration in which, for example, the mode switching section 203 obtains the condition of the processing load of the processor, and performs the switching in accordance with the condition of the processing load.

In FIG. 5, there is described the operation of the terminal device 10 in the case in which shooting by the imaging section 40 is performed, and the image data based on the shooting result of the imaging section 40 is transmitted to the projector 100 in real time.

It should be noted that during the implementation of the shooting by the imaging section 40, the control section 20 develops the image data based on the shooting result in the buffer formed in a working area such as a RAM as needed.

The image acquisition section 201 obtains the latest image data developed in the buffer with intervals corresponding to the acquisition frame rate.

As shown in FIG. 5, the image acquisition section 201 performs (step SC1) a setting process before starting the acquisition and output of the image data.

In the detailed description, in the setting process of the step SC1, the image acquisition section 201 outputs information representing intervals with which the image transfer section 202 outputs image processing time data J1 described later to the image acquisition section 201.

The "interval with which the image transfer section 202 outputs the image processing time data J1 described later to the image acquisition section 201" is set by the user in advance using a predetermined method.

Hereinafter, the interval with which the image transfer section 202 outputs the processing time data J1 described later to the image acquisition section 201 is referred to as an "image processing time data output interval." Further, timing reached with the image processing time data output interval is referred to as "image processing time data output timing."

As shown in FIG. 5, the image transfer section 202 obtains (step SD1) the information representing the image processing time data output interval output by the image acquisition section 201 in the step SC1.

In accordance with the acquisition of the information representing the image processing time data output interval, the processing time measurement section 202a starts (step SD2) the measurement of the image processing time data output interval, and at the same time, performs (step SD6) a measurement process.

The measurement process is a process for measuring (1) the number of times the image transfer section 202 performs the transmission of the image data to the projector 100 and (2) average time of the intervals with which the image transfer section 202 transmits the image data, during the period until the image processing time data output timing is reached next time. The interval with which the image transfer section 202 transmits the image data corresponds to the time necessary from when the image transfer section 202 obtains the image data to when the image transfer section 202 outputs the image data to the projector 100.

After performing the setting process, the image acquisition section 201 starts the acquisition of the image data and the output to the image transfer section 202 at a predetermined acquisition frame rate. During a period of the state in which the image processing time data J1 has not yet been input from the image transfer section 202, the image acquisition section 201 performs the acquisition and output of the image data at the acquisition frame rate as a default value. The default value of the acquisition frame rate is set to a sufficiently high value compared to the transmission frame rate so as not to be lower than the transmission frame rate.

Specifically, as shown in FIG. 5, the image acquisition section 201 sequentially performs acquisition of an image data in the step SC2, output of the image data in the step SC3, acquisition of an image data in the step SC4, output of the image data in the step SC5, acquisition of an image data in the step SC6, and output of the image data in the step SC7.

As shown in FIG. 5, the image transfer section 202 obtains (step SD3) the image data output by the image acquisition section 201 in the step SC3, then performs (step SD4) the image processing on the image data thus obtained, and then transmits (step SD5) the image data on which the image processing is performed to the projector 100.

The process of the step SC4 through the step SC7 by the image acquisition section 201 is performed during the period in which the step SD3 through step SD5 are executed by the image transfer section 202. Therefore, the image data obtained and then output by the image acquisition section 201 in the step SC5 and the step SC7 are discarded without being transmitted to the projector 100.

As shown in the step SC2 through SC7 and step SD3 through SD5, during the period until the first image processing time data output timing is reached, the image acquisition section 201 repeatedly performs the acquisition and the output of the image data at the acquisition frame rate, and further, the image transfer section 202 repeatedly performs the transmission of the image data at the transmission frame rate.

As shown in FIG. 5, when detecting that the first image processing time data output timing has been reached, the processing time measurement section 202a performs (step SD7) an image processing time data generation process based on the measurement process of the step SD6.

The image processing time data generation process is a process for generating the image processing time data J1.

The image processing time data J1 is data including (1) information representing the number of times of the transmission of the image data performed by the image transfer section 202 to the projector 100 in a measurement target period (described later), (2) information representing average time (hereinafter referred to as "processing average time") of the intervals with which the image transfer section 202 has transmitted the image data in the measurement target period (described later), and (3) information representing the length of the measurement target period.

The measurement target period denotes a period between one image processing time data output timing having been reached most recently and another image processing time data output timing having been reached previously to the one image processing time data output timing.

The image processing time data J1 corresponds to "information related to the processing capacity of the image transfer section 202."

After generating the image processing time data J1, the processing time measurement section 202a outputs (step SD8) the image processing time data J1 to the image acquisition section 201. In accordance with the output of the image processing time data J1, the processing time measurement section 202a starts (step SD9) the measurement of the image processing time data output interval, and at the same time, performs (step SD10) the measurement process.

As shown in FIG. 5, the frame rate adjustment section 201a of the image acquisition section 201 performs (step SC8) a frame rate adjustment process in accordance with the output of the image processing time data J1 by the processing time measurement section 202a in the step SD8.

Figure 6:
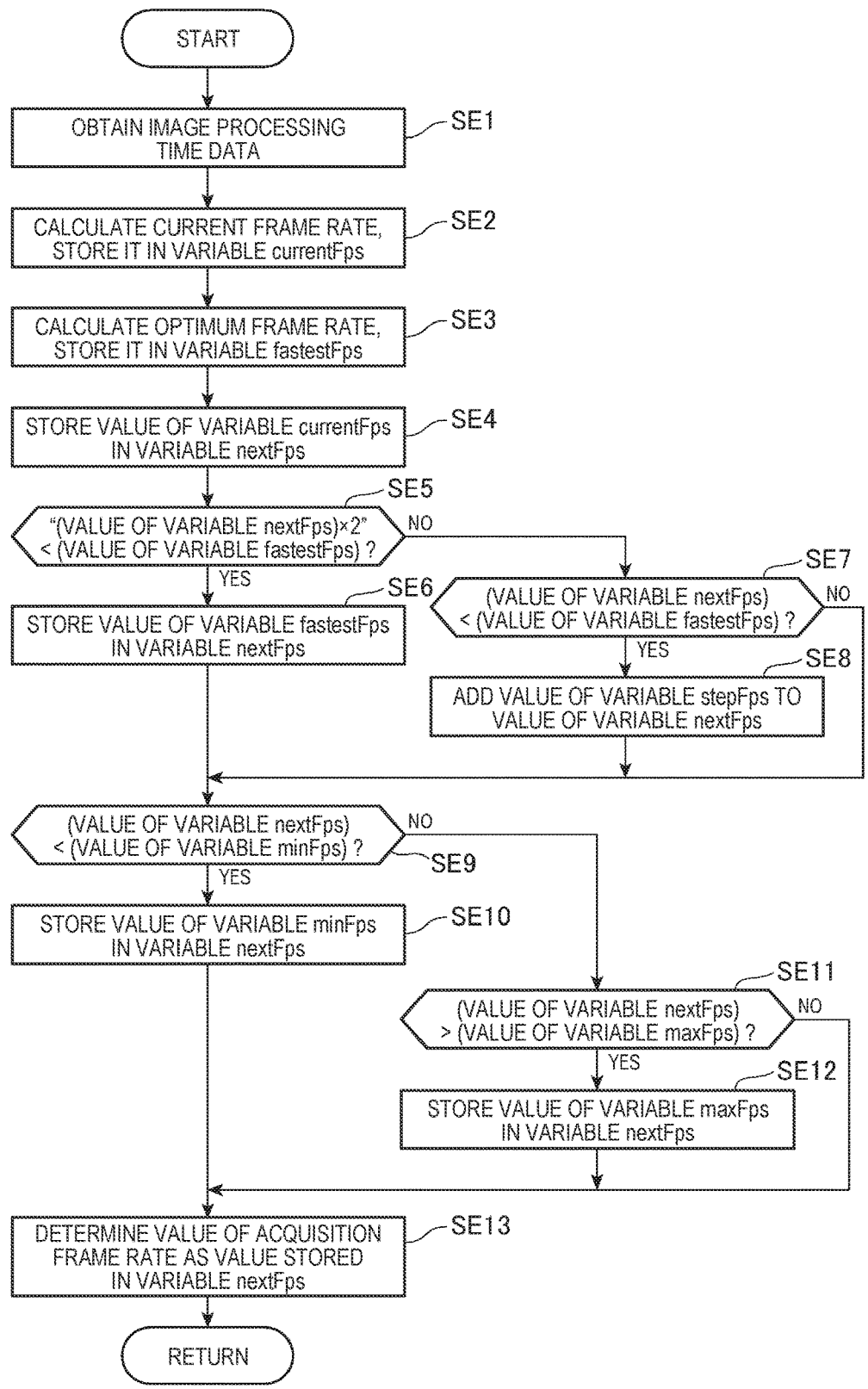
FIG. 6 is a flowchart showing an operation of a terminal device in a frame rate adjustment process.

FIG. 6 is a flowchart showing the details of the frame rate adjustment process.

As shown in FIG. 6, the frame rate adjustment section 201a obtains (step SE1) the image processing time data J1 output by the processing time measurement section 202a in the step SD8.

Subsequently, the frame rate adjustment section 201a calculates a current frame rate (described later), and then stores (step SE2) the value of the current frame rate in a variable currentFps. The details will be described below.

The variable currentFps conceptually represents a variable (e.g., a variable defined in a program realizing the function of the image acquisition section 201) in which the value of the current frame rate (described later) is stored.

In the step SE2, the frame rate adjustment section 201a calculates the current frame rate using the formula S1 below.

"(number of times of processing)/(image processing time data output interval)"   Formula S1:

The "number of times of processing" denotes the number of times the image acquisition section 201 has obtained and then output the image data during the measurement target period. The current frame rate calculated using the formula S1 denotes the actual acquisition frame rate in the measurement target period. In other words, the current frame rate denotes the number of times of the acquisition of the image data the image acquisition section 201 has actually performed per unit time during the measurement target period.

In the step SE2, the frame rate adjustment section 201a calculates the current frame rate, and then stores the value representing the current frame rate thus calculated in the variable currentFps.

Subsequently, the frame rate adjustment section 201a calculates an optimum frame rate (described later), and then stores (step SE3) the value of the optimum frame rate in a variable fastestFps. The details will be described below.

The variable fastestFps conceptually represents the variable in which the value of the optimum frame rate (described later) is stored.

In the step SE3, the frame rate adjustment section 201a calculates the optimum frame rate using the formula S2 below.

"(unit time)/(processing average time)"   Formula S2:

The optimum frame rate calculated using the formula S2 is the optimum acquisition frame rate from the viewpoint of reflecting the transmission of the image data actually performed by the image transfer section 202 in the measurement target period to synchronize the acquisition frame rate and the transmission frame rate with each other. Specifically, in theory, if the acquisition frame rate and the transmission frame rate are completely synchronized with each other, the unnecessary acquisition and output of the image data by the image acquisition section 201 are no longer performed. Further, the value of the optimum frame rate obtained using the formula S2 becomes a value similar to the actual transmission frame rate in the measurement target period.

In the step SE3, the frame rate adjustment section 201a calculates the optimum frame rate, and then stores the value representing the optimum frame rate thus calculated in the variable fastestFps.

Subsequently, the frame rate adjustment section 201a stores (step SE4) the value, which has been stored in the variable currentFps, in a variable nextFps.

The variable nextFps conceptually represents the variable in which the value of the acquisition frame rate in a next measurement target period (described later) is stored. The next measurement target period denotes a measurement target period following the measurement target period as the processing object at the present moment, and is specifically a period from the image processing time data output timing having been reached most recently to the image processing time data output timing to be reached next.

After the frame rate adjustment process is completed, the image acquisition section 201 performs the acquisition and the output of the image data during the next measurement target period at the acquisition frame rate of the value stored in the variable nextFps.

Subsequently, the frame rate adjustment section 201a determines (step SE5) whether or not a "value twice as large as the value stored in the variable nextFps" is smaller than a "value of the optimum frame rate stored in the variable fastestFps."

Here, at the time point of the step SE5, the current frame rate is stored in the variable nextFps. In the light of this point, in the step SE5, there is determined whether or not the actual acquisition frame rate in the measurement target period is as low as to be lower than a half of the optimum frame rate based on the actual transmission frame rate in the measurement target period. In the case in which the actual acquisition frame rate is low, it is necessary to increase the acquisition frame rate to make the acquisition frame rate and the value of the transmission frame rate closer to each other.

In the case in which the "value twice as large as the value stored in the variable nextFps" is smaller than the "value of the optimum frame rate stored in the variable fastestFps" (YES in the step SE5), the frame rate adjustment section 201a stores (step SE6) the value of the variable fastestFps to the variable nextFps.

After the process in the step SE6, the frame rate adjustment section 201a makes the transition of the processing procedure to the step SE9.

In the case in which the "value twice as large as the value stored in the variable nextFps" is not smaller than the "value of the optimum frame rate stored in the variable fastestFps" (NO in the step SE5), the frame rate adjustment section 201a determines (step SE7) whether or not the value stored in the variable nextFps is smaller than the value stored in the variable fastestFps.

In the case in which the value stored in the variable nextFps is smaller than the value stored in the variable fastestFps (YES in the step SE7), the frame rate adjustment section 201a adds (step SE8) a value stored in a variable stepFps to the value stored in the variable nextFps.

The variable stepFps conceptually represents a variable in which a predetermined preset value is stored under the viewpoint that the value stored in the variable nextFps is raised as high as possible in the case in which the "value twice as large as the value stored in the variable nextFps" is not smaller than the "value of the optimum frame rate stored in the variable fastestFps," and the value stored in the variable nextFps is smaller than the value stored in the fastestFps.

After the process in the step SE8, the frame rate adjustment section 201a makes the transition of the processing procedure to the step SE9.

In contrast, in the case in which the value stored in the variable nextFps is not smaller than the value stored in the variable fastestFps (NO in the step SE7), the frame rate adjustment section 201a makes the transition of the processing procedure to the step SE9. In this case, at the beginning of the process in the step SE9, there occurs the state in which the value (the value of the current frame rate calculated) stored in the variable currentFps is stored in the variable nextFps.

In the step SE9, the frame rate adjustment section 201a determines whether or not the value stored in the variable nextFps is lower than the value stored in a variable minFps.

The variable minFps conceptually represents the variable in which the lower limit value of the acquisition frame rate is stored.

In the case in which the value stored in the variable nextFps is lower than the value stored in the variable minFps (YES in the step SE9), the frame rate adjustment section 201a stores (step SE10) the value stored in the variable minFps to the variable nextFps. As a result of the process in the step SE10, the acquisition frame rate in the next measurement target period is prevented from being set to a value lower than the lower limit value.

After the process in the step SE10, the frame rate adjustment section 201a makes the transition of the processing procedure to the step SE13.

In the case in which it has been determined in the step SE9 that the value stored in the variable nextFps is not lower than the value stored in the variable minFps (NO in the step SE9), the frame rate adjustment section 201a determines (step SE11) whether or not the value stored in the variable nextFps exceeds a value stored in a variable maxFps.

The variable maxFps conceptually represents the variable in which the upper limit value of the acquisition frame rate is stored.

In the case in which the value stored in the variable nextFps exceeds the value stored in the variable maxFps (YES in the step SE11), the frame rate adjustment section 201a stores (step SE12) the value stored in the variable maxFps to the variable nextFps. As a result of the process in the step SE12, the acquisition frame rate in the next measurement target period is prevented from being set to a value exceeding the upper limit value.

After the process in the step SE12, the frame rate adjustment section 201a makes the transition of the processing procedure to the step SE13.

In the case in which it has been determined in the step SE11 that the value stored in the variable nextFps does not exceed the value stored in the variable maxFps (NO in the step SE11), the frame rate adjustment section 201a makes the transition of the processing procedure to the step SE13. It should be noted that in this case, there occurs the state in which the value of the optimum frame rate or a value approximate to the optimum frame rate is stored in the variable nextFps.

In the step SE13, the frame rate adjustment section 201a sets (determines) the frame rate of the value stored in the variable nextFps as the acquisition frame rate in the next measurement target period.

As described above, in the frame rate adjustment process, the frame rate adjustment section 201a sets (determines) the acquisition frame rate in the next measurement target period.

As shown in FIG. 5, after performing the frame rate adjustment process in the step SC8, the image acquisition section 201 repeatedly performs the acquisition and the output of the image data at the acquisition frame rate set by the frame rate adjustment process during the period until the next image processing time data output timing is reached as shown in step SC9 through step SC12. Meanwhile, the image transfer section 202 repeatedly performs the acquisition of the image data corresponding to the output of the image data of the image acquisition section 201, the image processing on the image data, and the transmission of the image data to the projector 100 during the period until the next image processing time data output timing is reached as shown in the step SD11 through the step SD16.

Here, as described above, the value of the acquisition frame rate having been set in the frame rate adjustment process is the value guaranteed not to be lower than the lower limit value and not to exceed the upper limit value, and further, equal or approximate to the value of the optimum frame rate. Further, as described above, the optimum frame rate is the optimum acquisition frame rate from the viewpoint of reflecting the transmission of the image data actually performed by the image transfer section 202 in the measurement target period to synchronize the acquisition frame rate and the transmission frame rate with each other. Therefore, by the image acquisition section 201 performing the process at the acquisition frame rate set by the frame rate adjustment process, it becomes possible to prevent the image acquisition section 201 from unnecessarily perform the acquisition and the output of the image data.

As shown in FIG. 5, when it is detected that the next image processing time data output timing has been reached, the processing time measurement section 202a generates (step SD17) the image processing time data J1, and then outputs (step SD18) the image processing time data J1 to the frame rate adjustment section 201a.

The frame rate adjustment section 201a performs (step SC13) the frame rate adjustment process based on the image processing time data J1.

After performing the frame rate adjustment process, the image acquisition section 201 performs the acquisition and the output of the image data at the acquisition frame rate set by the frame rate adjustment process.

As described hereinabove, in the second mode, the processing time measurement section 202a generates the image processing time data J1 and outputs the image processing time data J1 to the frame rate adjustment section 201a with the image processing time data output intervals. Further, the processing time measurement section 202a performs the frame rate adjustment process based on the image processing time data J1 to set the acquisition frame rate, and then performs the process at the acquisition frame rate thus set.

According to this configuration, the following advantages can be obtained.

That is, as described above, by the image acquisition section 201 performing the process at the acquisition frame rate set by the frame rate adjustment process, it is possible to prevent the image acquisition section 201 from unnecessarily perform the acquisition and the output of the image data. Thus, it is possible to realize the improvement of the efficiency of the process, to prevent the processing load of the processor from unnecessarily increasing, and to suppress the influence on the process of the image transfer section 202.

Further, the frame rate adjustment process is performed to set the acquisition frame rate with the image processing time data output intervals. Therefore, even in the case in which the transmission frame rate varies in accordance with the communication state between the terminal device 10 and the projector 100, the usage condition of the processor by other programs running in the terminal device 10, and so on, the value of the acquisition frame rate can dynamically be set in accordance with the change in the transmission frame rate due to the frame rate adjustment process performed periodically.

As described hereinabove, the terminal device 10 (the image supply device) according to the present embodiment is provided with the image acquisition section 201 for obtaining the image data, and the image transfer section 202 for transmitting the image data obtained by the image acquisition section 201, and the image transfer section 202 outputs the image processing time data J1 (information related to the processing capacity of the image transfer section 202) to the image acquisition section 201, and the image acquisition section 201 determines the acquisition frame rate (the frequency of outputting the image data to the image transfer section 202) based on the image processing time data J1.

According to this configuration, it is possible for the image acquisition section 201 to output the image data to the image transfer section 202 at an appropriate acquisition frame rate reflecting the processing capacity of the image transfer section 202, and it is possible to prevent the image acquisition section 201 from unnecessarily performing the output of the image data to the image transfer section 202, and thus, the processing efficiency can be improved, and at the same time the processing load can be reduced.

Further, in the present embodiment, the image processing time data J1 includes the information based on the time actually required by the image transfer section 202 for performing the process related to the transmission of the image data.

According to this configuration, it is possible for the image acquisition section 201 to determine the acquisition frame rate reflecting the time actually required by the image transfer section 202 for performing the process related to the transmission of the image data to thereby set the acquisition frame rate to an appropriate value.

Further, in the present embodiment, the image transfer section 202 outputs the image processing time data J1 to the image acquisition section 201 with predetermined intervals, and the image acquisition section 201 determines the acquisition frame rate in response to the input of the image processing time data J1, and then performs the output of the image data at the acquisition frame rate determined.

According to this configuration, even in the case in which the transmission frame rate varies in accordance with the communication state between the terminal device 10 and the projector 100, the usage condition of the processor by other programs running in the terminal device 10, and so on, the value of the acquisition frame rate can dynamically be set in accordance with the change in the transmission frame rate due to the determination of the acquisition frame rate performed periodically with intervals.

Further, the terminal device 10 according to the present embodiment is further provided with the processor. Further, the processor of the terminal device 10 executes the first program to thereby realize the function of the image acquisition section 201, and executes the second program different from the first program to thereby realize the function of the image transfer section 202.

According to this configuration, due to the fact that the image acquisition section 201 for realizing the function based on the first program and the image transfer section 202 for realizing the function based on the second program use the common processor, under the condition that the process of either one of the functional sections increases the processing load of the processor to affect the process of the other of the functional sections, by improving the processing efficiency, the increase in processing load of the processor can effectively be suppressed.

Further, the terminal device 10 according to the present embodiment is further provided with the imaging section 40 for performing shooting. The image transfer section 202 transmits the image data based on the shooting result of the imaging section 40 in real time in response to the shooting.

According to this configuration, it is possible for the terminal device 10 to transmit the image data based on the shooting result by the imaging section 40 to the projector 100 (an external device) in real time in response to the shooting to thereby make the projector 100 perform display (a predetermined process) of the image based on the image data.

Further, in the present embodiment, in the case of transmitting the image data based on the shooting result of the imaging section 40 in real time in response to the shooting, the image transfer section 202 performs the process of outputting the information related to the processing capacity of the image transfer section 202 to the image acquisition section 201, and at the same time, the image acquisition section 201 performs the process of determining the frequency of outputting the image data to the image transfer section 202 based on the information related to the processing capacity of the image transfer section 202.

According to this configuration, in the light of the fact that the process related to the shooting of the imaging section 40 is heavy in processing load, suppression of the increase of the processing load can effectively be realized.

Further, the terminal device 10 according to the present embodiment is further provided with the mode switching section 203 for switching the operation mode. The mode switching section 203 switches the operation mode to either of the first mode for transmitting image data other than the image data based on the shooting result of the imaging section 40 and the second mode for transmitting the image data based on the shooting result of the imaging section 40 in real time in response to the shooting.

According to this configuration, in the light of the fact that the process related to the shooting of the imaging section 40 is heavy in processing load, by switching the operation mode with appropriate timing, suppression of the increase of the processing load can effectively be realized.

It should be noted that the embodiment described above is only for showing an aspect of the invention, and can arbitrarily be modified or applied within the scope or the spirit of the invention.

For example, in the embodiment described above, there is adopted the configuration in which the image transfer section 202 calculates the processing average time. However, it is also possible to adopt a configuration in which the image acquisition section 201 obtains the necessary information from the image transfer section 202 to calculate the processing average time.

Further, although in the above description of the embodiment, the explanation is presented citing the configuration, in which the three transmissive liquid crystal panels corresponding respectively to the colors of R, G, and B are used as the light modulation device 112 for modulating the light emitted by the light source, as an example, the invention is not limited to this example. For example, it is also possible to adopt a configuration of using three reflective liquid crystal panels, or to use a system having a liquid crystal panel and a color wheel combined with each other. Alternatively, the invention can be constituted by a system using three digital mirror devices (DMD), a DMD system having a single digital mirror device and a color wheel combined with each other, or the like. In the case of using just one liquid crystal panel or DMD as the light modulation device, the member corresponding to the combining optical system such as the cross dichroic prism is unnecessary. Further, besides the liquid crystal panel or the DMD, any light modulation device capable of modulating the light emitted by the light source can be adopted without problems. Further, it is also possible to use a reflective liquid crystal element such as an LCOS (liquid crystal on silicon, LCoS is a registered trademark) as the light modulation device 112.

Further, although in the embodiment described above, there is described the front projection type projector 100 for performing the projection from the front of the screen SC as the projector 100, the invention is not limited to this example.

Further, in the case in which the method (the method of controlling the image supply device) of controlling the terminal device 10 is realized using a computer provided to the terminal device 10, or an external device connected to the terminal device 10, it is also possible to configure the invention as an aspect of a program executed by the computer for realizing the method, a recording medium storing the program in a non-transitory and computer-readable manner, or a transmission medium for transmitting the program. As the recording medium described above, there can be used a magnetic or optical recording device, or a semiconductor memory device. Specifically, there can be cited a portable or rigid recording medium such as a flexible disk, a hard disk drive (HDD), a CD-ROM (compact disk read only memory), a digital versatile disk (DVD), a Blu-ray (registered trademark) disk, a magnetooptic disk, a flash memory, or a card-type recording medium. Further, the recording medium described above can also be a nonvolatile storage device such as the random access memory (RAM), the read only memory (ROM), or the HDD as the internal storage device provided to the terminal device 10 or the external device connected to the terminal device 10.

Further, each of the functional sections shown in FIG. 2 and FIG. 3 is for showing the functional configuration, and the specific implementation configuration is not particularly limited. In other words, it is not necessarily required to install the hardware corresponding individually to each of the functional sections, but it is obviously possible to adopt the configuration of realizing the functions of the plurality of functional sections by a single processor executing a program. Further, apart of the function realized by software in the embodiments described above can also be realized by hardware, or a part of the function realized by hardware can also be realized by software. Besides the above, the specific detailed configuration of each of other sections of the terminal device 10 and the projector 100 can arbitrarily be modified within the scope or the spirit of the invention.

What is claimed is:

1. An image supply device comprising:
   a processor programmed to function as:
   an image acquisition section adapted to obtain an image data and transmit the obtained image data to an image transfer section, the image acquisition section transmitting the obtained image data at a first acquisition frame rate for transmitting data per unit time of outputting the obtained image data; and
   the image transfer section adapted to transmit the image data received from the image acquisition section to an external device, wherein
   the image transfer section outputs information related to a processing capacity of the image transfer section to the image acquisition section,
   the image acquisition section changes the first acquisition frame rate to a second acquisition frame rate based on the information related to the processing capacity of the image transfer section.

2. The image supply device according to claim 1, wherein the information related to the processing capacity of the image transfer section is information based on time actually required by the image transfer section for performing a process related to transmission of the image data.

3. The image supply device according to claim 1, wherein the image transfer section outputs the information related to the processing capacity of the image transfer section to the image acquisition section with predetermined intervals, and
   the image acquisition section determines the acquisition frame rate of outputting the image data to the image transfer section based on the information related to the processing capacity of the image transfer section, and performs output of the image data with the determined acquisition frame rate.

4. The image supply device according to claim 1, wherein the processor executes a first program to thereby realize a function of the image acquisition section, and executes a second program different from the first program to thereby realize a function of the image transfer section.

5. The image supply device according to claim 1, further comprising:
   an imaging section adapted to perform shooting, wherein the image transfer section transmits the image data based on a shooting result of the imaging section in real time in response to the shooting.

6. The image supply device according to claim 5, wherein in a case of transmitting the image data based on the shooting result of the imaging section in real time in response to the shooting, the image transfer section performs a process of outputting the information related to the processing capacity of the image transfer section to the image acquisition section, and the image acquisition section performs a process of determining the acquisition frame rate of outputting the image data to the image transfer section based on the information related to the processing capacity of the image transfer section.

7. The image supply device according to claim 5, further comprising:
   a mode switching section adapted to switch an operation mode, wherein
   the mode switching section switches the operation mode to either of a first mode for transmitting image data other than the image data based on the shooting result of the imaging section and a second mode for transmitting the image data based on the shooting result of the imaging section in real time in response to the shooting.

8. A method of controlling an image supply device comprising:
   providing the image supply device with: (i) an image acquisition section adapted to obtain an image data and to transmit the obtained image data at a first acquisition frame rate for transmitting data per unit time of outputting the obtained image data, and (ii) an image transfer section adapted to receive the obtained image data transmitted from the image acquisition section and to transmit the image data to an external device;
   outputting, by the image transfer section, information related to a processing capacity of the image transfer section to the image acquisition section; and
   changing, by the image acquisition section, the first acquisition frame rate to a second acquisition frame rate based on the information related to the processing capacity of the image transfer section.

9. A non-transitory computer-readable medium storing a program to be executed by a processor adapted to control an image supply device, the image supply device having: (i) an image acquisition section adapted to obtain an image data and to transmit the obtained image data at a first acquisition frame rate for transmitting data per unit time of outputting the obtained image data, and (ii) an image transfer section adapted to receive the obtained image data transmitted from the image acquisition section and to transmit the image data to an external device, the program causing the processor to perform steps comprising:
   outputting, by the image transfer section, information related to a processing capacity of the image transfer section to the image acquisition section; and
   changing, by the image acquisition section, the first acquisition frame rate to a second acquisition frame rate based on the information related to the processing capacity of the image transfer section.

* * * * *